United States Patent
Peng et al.

(10) Patent No.: US 10,779,195 B2
(45) Date of Patent: Sep. 15, 2020

(54) INFORMATION TRANSMISSION METHOD AND APPARATUS

(71) Applicant: HUAWEI TECHNOLOGIES CO., LTD., Shenzhen, Guangdong (CN)

(72) Inventors: Wenjie Peng, Shanghai (CN); Jing Liu, Shanghai (CN); Haiyan Luo, Shanghai (CN); Mingzeng Dai, Shanghai (CN); Qinghai Zeng, Shanghai (CN); Tingting Wang, Shenzhen (CN); Hongzhuo Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/458,174

(22) Filed: Jun. 30, 2019

(65) Prior Publication Data
US 2019/0327642 A1    Oct. 24, 2019

Related U.S. Application Data

(63) Continuation of application No. PCT/CN2018/071511, filed on Jan. 5, 2018.

(30) Foreign Application Priority Data

Jan. 5, 2017 (CN) .......................... 2017 1 0008434

(51) Int. Cl.
*H04W 36/14* (2009.01)
*H04W 28/08* (2009.01)
*H04W 28/02* (2009.01)

(52) U.S. Cl.
CPC ....... *H04W 28/08* (2013.01); *H04W 28/0236* (2013.01); *H04W 28/0263* (2013.01)

(58) Field of Classification Search
None
See application file for complete search history.

(56) References Cited

U.S. PATENT DOCUMENTS

2014/0204771 A1* 7/2014 Gao ..................... H04W 36/28
370/252
2015/0043492 A1  2/2015 Baek et al.
(Continued)

FOREIGN PATENT DOCUMENTS

CA        2920995 A1    2/2015
CN     103875275 A     6/2014
(Continued)

OTHER PUBLICATIONS

Samsung,"Two levels for "QOS flow mobility"",3GPP TSG-RAN WG2 Meeting #96bis R2-1700028,Spokane, USA, Jan. 17-19, 2017,total 4 pages.

*Primary Examiner* — Sithu Ko
(74) *Attorney, Agent, or Firm* — Huawei Technologies Co., Ltd.

(57) ABSTRACT

This application discloses an information transmission method in a communication system. According to the method, a master base station sends a request message to a secondary base station for requesting to transfer one or more flows from the master base station to the secondary base station for transmission to a terminal device. The request message carries one or both of identification information of each flow, and information of a data radio bearer (DRB) associated with each flow. The master base station receives a response message from the secondary base station, indicating whether each of the one or more flows is admitted or rejected by the secondary base station. Based on the identification information of the flows, DRBs are mapped to the flows. QoS management of information transmission is more refined, and requirements of 5G communication sys- (Continued)

tems for QoS management of information transmission in a dual connectivity scenario can be met.

16 Claims, 8 Drawing Sheets

(56) References Cited

U.S. PATENT DOCUMENTS

| | | |
|---|---|---|
| 2015/0045035 A1 | 2/2015 | Nigam et al. |
| 2015/0373584 A1* | 12/2015 | Hong .................... H04W 28/08 370/329 |
| 2016/0156485 A1* | 6/2016 | Zhang ................ H04L 12/4633 709/227 |
| 2016/0192244 A1* | 6/2016 | Worrall ............ H04W 28/0236 370/332 |
| 2016/0262194 A1* | 9/2016 | Zhang ................... H04W 76/10 |
| 2016/0316351 A1* | 10/2016 | Kodaypak ............... H04W 4/06 |
| 2016/0338130 A1 | 11/2016 | Park et al. |
| 2017/0006603 A1 | 1/2017 | Chen et al. |
| 2017/0055313 A1* | 2/2017 | Sharma ................ H04W 76/15 |
| 2017/0303286 A1* | 10/2017 | Sang .................... H04W 76/15 |
| 2019/0166647 A1* | 5/2019 | Velev .................... H04W 76/11 |
| 2019/0191348 A1* | 6/2019 | Futaki ................... H04W 36/12 |

FOREIGN PATENT DOCUMENTS

| | | |
|---|---|---|
| CN | 104519529 A | 4/2015 |
| CN | 104796948 A | 7/2015 |
| CN | 104797000 A | 7/2015 |
| CN | 104918329 A | 9/2015 |
| WO | 2013155709 A1 | 10/2013 |
| WO | 2015192578 A1 | 12/2015 |

\* cited by examiner

INFORMATION TRANSMISSION METHOD AND APPARATUS

CROSS-REFERENCE TO RELATED APPLICATIONS

This application is a continuation of International Application No. PCT/CN2018/071511, filed on Jan. 5, 2018, which claims priority to Chinese Patent Application No. 201710008434.X, filed on Jan. 5, 2017. The disclosures of the aforementioned applications are hereby incorporated by reference in their entireties.

TECHNICAL FIELD

This application relates to the field of communications, and in particular, to an information transmission method and apparatus.

BACKGROUND

The quality of service (QoS) mechanism is a security mechanism of a network. A network device processes data with different priorities by using the QoS mechanism, to help reducing problems such as network latency and network congestion.

In a Long Term Evolution (LTE) system, a core network device maps different flows to evolved packet system (EPS) bearers. One EPS bearer includes one S1 bearer and one data radio bearer (DRB). The core network device communicates with a base station by using the S1 bearer, and the base station communicates with a terminal device by using the DRB. In a dual connectivity (DC) scenario, when a master base station determines to transfer a DRB to a secondary base station, the master base station needs to notify the core network device of an identifier of the DRB that is to be transferred to the secondary base station, so that the core network device may establish a transmission channel corresponding to the DRB with the secondary base station.

However, in a Fifth Generation (5G) communication system, higher requirements on QoS management of data is imposed. In other words, more refined QoS management needs to be performed on the data. In the existing technology, DRB-based information transmission performed between the master base station and the secondary base station cannot meet the requirements of the 5G communication system for QoS management.

SUMMARY

Embodiments of this application provide an information transmission method and apparatus, to meet requirements of a 5G communication system for quality of service (QoS) management of information transmission in a dual connectivity scenario.

According to a first aspect, an information transmission method is provided. The method includes: sending, by a master base station, a request message to a secondary base station, where the request message includes identification information of a flow, or the request message includes identification information of a flow and a mapping relationship between the flow and a DRB; and receiving, by the master base station from the secondary base station, a response message in response to the request message.

According to the information transmission method provided in this embodiment, the master base station sends, to the secondary base station, identification information used to indicate at least one flow, or the master base station sends, to the secondary base station, identification information used to indicate at least one flow and a mapping relationship between the at least one flow and one or more DRBs, so that the secondary base station can map flows to different DRBs based on QoS requirements of the flows, thereby implementing QoS management with smaller granularity.

Optionally, the identification information of the flow includes a QoS mark of the flow.

According to the information transmission method provided in this embodiment, the master base station uses the QoS mark of the flow as the identification information of the flow, so that different flows can be directly distinguished, and QoS management with smaller granularity is implemented.

Optionally, the identification information of the flow includes an identifier of a protocol data unit (PDU) session to which the flow belongs. Therefore, different flows can be distinguished, and QoS management with smaller granularity is implemented.

Optionally, the request message further includes QoS characteristic information of the flow.

According to the information transmission method provided in this embodiment, the master base station sends the QoS characteristic information of the flow to the secondary base station, so that the secondary base station can determine a QoS requirement of the flow for the DRB based on the QoS characteristic information of the flow.

Optionally, the request message further includes a DRB identifier available to the secondary base station.

According to the information transmission method provided in this embodiment, the master base station sends, to the secondary base station, the DRB identifier available to the secondary base station. The secondary base station may map the flow to the DRB based on the DRB identifier available to the secondary base station, to avoid a conflict between a DRB mapped by the master base station and a DRB mapped by the secondary base station, and reduce load of the master base station.

Optionally, the request message further includes a DRB identifier unavailable to the secondary base station.

The master base station may send, to the secondary base station, the DRB identifier unavailable to the secondary base station. For example, the master base station may send an identifier list of DRBs unavailable to the flow to the secondary base station, to avoid a conflict between a DRB mapped by the master base station and a DRB mapped by the secondary base station, and reduce load of the master base station.

Optionally, the response message includes identification information of a flow admitted by the secondary base station and tunnel endpoint information corresponding to the flow admitted by the secondary base station.

Therefore, the master base station may determine, based on the response message, a flow that can be split to the secondary base station.

Optionally, the response message includes identification information of a flow that is not admitted by the secondary base station.

Therefore, the master base station may determine, based on the response message, a flow that can be split to the secondary base station.

Optionally, the method further includes: sending, by the master base station to a core network device, the identification information of the flow admitted by the secondary base station and the tunnel endpoint information corresponding to the flow admitted by the secondary base station; or sending, by the master base station to a core network device, identification information of a flow admitted by the master base station, tunnel endpoint information corresponding to the flow admitted by the master base station, the identification information of the flow admitted by the secondary base station, and the tunnel endpoint information corresponding to the flow admitted by the secondary base station.

Both the flow admitted by the master base station and the flow admitted by the secondary base station are flows in a PDU session sent by a core network to the master base station.

According to the information transmission method provided in this embodiment, the base station sends, to the core network device, tunnel endpoint information corresponding to a flow included in the PDU session on the secondary base station, or the base station sends, to the core network device, tunnel endpoint information corresponding to a flow included in the PDU session on the master base station and tunnel endpoint information corresponding to the flow included in the PDU session on the secondary base station, so that a bearer can be created or transferred based on flow information.

Optionally, the method further includes: sending, by the master base station to a core network device, the identification information of the flow admitted by the secondary base station, the tunnel endpoint information corresponding to the flow admitted by the secondary base station, and an identifier of the secondary base station; or sending, by the master base station to a core network device, identification information of a flow admitted by the master base station, tunnel endpoint information corresponding to the flow admitted by the master base station, the identification information of the flow admitted by the secondary base station, the tunnel endpoint information corresponding to the flow admitted by the secondary base station, an identifier of the master base station, and an identifier of the secondary base station.

Therefore, when flows in a PDU session are respectively carried by different base stations, the core network device may determine, based on an identifier of a base station, a base station to which a flow in the PDU session is sent.

Optionally, the method further includes: sending, by the master base station, DRB configuration information to user equipment, where the DRB configuration information includes a DRB identifier and identification information of a flow corresponding to the DRB.

According to the information transmission method provided in this embodiment, the user equipment may receive a flow from at least one of the master base station and the secondary base station based on the DRB configuration information, and a bearer can be created and transferred based on flow information.

Optionally, before the sending, by a master base station, a request message to a secondary base station, the method further includes: receiving, by the master base station, a flow identifier from the user equipment; and establishing, by the master base station, a bearer for a flow indicated by the flow identifier.

According to the information transmission method provided in this embodiment, the base station establishes, based on the flow identifier received from the user equipment, the bearer for the flow indicated by the flow identifier, so that a bearer can be created and transferred based on flow information, and a requirement of a 5G communication system for QoS management of information transmission can be met.

According to a second aspect, an information transmission method is provided. The method includes: receiving, by a secondary base station, a request message from a master base station, where the request message includes identification information of a flow, or the request message includes identification information of a flow and a mapping relationship between the flow and a DRB; and sending, by the secondary base station to the master base station, a response message in response to the request message.

According to the information transmission method provided in this embodiment, the secondary base station receives the identification information of the flow sent by the master base station, to determine a QoS requirement of the flow based on the identification information of the flow, and map the flow to a DRB that meets the QoS requirement of the flow, thereby implementing more refined QoS management on data.

Optionally, the identification information of the flow includes a quality of service QoS mark of the flow.

Therefore, the secondary base station can directly distinguish between different flows, thereby implementing QoS management with smaller granularity.

Optionally, the identification information of the flow includes an identifier of a PDU session to which the flow belongs.

Therefore, the secondary base station can distinguish between different flows, thereby implementing QoS management with smaller granularity.

Optionally, the request message further includes QoS characteristic information of the flow.

Therefore, the secondary base station may determine the QoS requirement of the flow for the DRB based on the QoS characteristic information of the flow.

Optionally, the request message further includes a DRB identifier available to the secondary base station.

According to the information transmission method provided in this embodiment, the master base station sends, to the secondary base station, the DRB identifier available to the secondary base station. The secondary base station may map the flow to the DRB based on the DRB identifier available to the secondary base station, to avoid a conflict between a DRB mapped by the master base station and a DRB mapped by the secondary base station, and reduce load of the master base station.

Optionally, the request message further includes a DRB identifier unavailable to the secondary base station.

The master base station may send, to the secondary base station, the DRB identifier unavailable to the secondary base station. For example, the master base station may send an identifier list of DRBs unavailable to the flow to the secondary base station, to avoid a conflict between a DRB mapped by the master base station and a DRB mapped by the secondary base station, and reduce load of the master base station.

Optionally, the response message includes identification information of a flow admitted by the secondary base station and tunnel endpoint information corresponding to the flow admitted by the secondary base station.

Therefore, the master base station may determine, based on the response message, a flow that can be split to the secondary base station.

Optionally, the response message includes identification information of a flow that is not admitted by the secondary base station.

Therefore, the master base station may determine, based on the response message, a flow that can be split to the secondary base station.

According to a third aspect, an information transmission method is provided. The method includes: receiving, by a core network device from a master base station, identification information of a flow admitted by a secondary base station and tunnel endpoint information corresponding to the flow admitted by the secondary base station; and sending, by the core network device to the secondary base station based on the tunnel endpoint information corresponding to the flow admitted by the secondary base station, the flow admitted by the secondary base station.

According to the information transmission method provided in this embodiment, the core network device may send a flow to the secondary base station based on tunnel endpoint information that is received from the master base station and that is corresponding to the flow migrated to the secondary base station on the secondary base station, so that a bearer can be transferred based on flow information.

Optionally, the method further includes: receiving, by the core network device, an identifier of the secondary base station from the master base station.

Therefore, when flows in a PDU session are respectively carried by different base stations, the core network device may determine, based on an identifier of a base station, a base station to which a flow in the PDU session is sent.

According to a fourth aspect, an information transmission method is provided. The method includes: receiving, by a core network device from a master base station, identification information of a flow admitted by the master base station, tunnel endpoint information corresponding to the flow admitted by the master base station, identification information of a flow admitted by a secondary base station, and tunnel endpoint information corresponding to the flow admitted by the secondary base station; sending, by the core network device to the master base station based on the tunnel endpoint information corresponding to the flow admitted by the master base station, the flow admitted by the master base station; and sending, by the core network device to the secondary base station based on the tunnel endpoint information corresponding to the flow admitted by the secondary base station, the flow admitted by the secondary base station.

According to the information transmission method provided in this embodiment, flows may be sent to the master base station and the secondary base station based on tunnel endpoint information corresponding to a flow on the master base station and tunnel endpoint information corresponding to the flow on the secondary base station, where the two pieces of tunnel endpoint information are received from the master base station, so that a bearer can be created based on flow information.

Optionally, the method further includes: receiving, by the core network device, an identifier of the master base station and an identifier of the secondary base station from the master base station.

Therefore, when flows in a PDU session are respectively carried by different base stations, the core network device may determine, based on an identifier of a base station, a base station to which a flow in the PDU session is sent.

According to a fifth aspect, an information transmission method is provided. The method includes: determining, by a user equipment device (UE), a first DRB based on identification information of first data; and sending, by the UE, the first data by using the first DRB.

According to the information transmission method provided in this embodiment, the UE may determine a DRB that matches a QoS requirement of uplink data, and a bearer can be created and transferred based on flow information.

Optionally, the determining, by UE, a first DRB based on identification information of first data includes: determining, by the UE, that a default bearer corresponding to an identifier of a PDU session is the DRB, where the identification information of the first data includes the identifier of the PDU session.

According to the information transmission method provided in this embodiment, the default bearer may be on a master base station, or may be on a secondary base station. The UE may determine the DRB that matches the QoS requirement of the uplink data without exchanging information with another network element, so that signaling overheads can be reduced.

Optionally, the determining, by the UE, a first DRB based on identification information of first data includes: sending, by the UE, a first request message to a base station, where the first request message includes identification information of the first data, and the first request message is used to request the base station to perform DRB mapping for the first data; and receiving, by the UE, a reply message from the base station, where the reply message includes a mapping relationship between the first data and the first DRB.

Therefore, the UE may determine the DRB that matches the QoS requirement of the uplink data, and a bearer can be created and transferred based on flow information.

Optionally, the method further includes: determining, by the UE, the identification information of the first data based on upper layer information and non-access stratum information.

Therefore, according to the information transmission method provided in this embodiment, an access stratum of the UE determines identification information of the uplink data based on the upper layer information and the non-access stratum information, to determine, based on the identification information of the uplink data, the DRB for sending the uplink data.

According to a sixth aspect, embodiments of this application provides an information transmission method, including: receiving, by a UE, a configuration message from a master base station, where the configuration message includes DRB configuration information on the master base station and DRB configuration information on a secondary base station, the DRB configuration information on the master base station includes an identifier of a flow corresponding to a DRB established on the master base station, and the DRB configuration information on the secondary base station includes an identifier of a flow corresponding to a DRB established on the secondary base station; and sending, by the UE to the master base station, a response message in response to the configuration message.

Optionally, the response message is used to indicate that the UE completes configuration corresponding to the DRB configuration information on the master base station and configuration corresponding to the DRB configuration information on the secondary base station.

When a DRB needs to be established, the UE may receive data (namely, a flow) from at least one of the master base station and the secondary base station based on DRB configuration information, and a bearer can be created and transferred based on flow information.

Optionally, the configuration message is a radio resource control (RRC) connection reconfiguration message.

Optionally, the DRB configuration information on the master base station further includes an identifier of a protocol data unit (PDU) session to which the flow corresponding to the DRB established on the master base station belongs, and/or the DRB configuration information on the secondary base station further includes an identifier of a PDU session to which the flow corresponding to the DRB established on the secondary base station belongs.

Optionally, the identifier of the PDU session to which the flow corresponding to the DRB established on the master base station belongs is the same as the identifier of the PDU session to which the flow corresponding to the DRB established on the secondary base station belongs.

Optionally, the method further includes: determining, by the UE, that a DRB corresponding to an identifier of a PDU session to which uplink data belongs is a default bearer, where the default bearer is established on the master base station, or the default bearer is established on the secondary base station.

According to a seventh aspect, an embodiment provides an information transmission apparatus. The apparatus can implement functions performed by the master base station in the method in the first aspect. The functions may be implemented by using hardware, or may be implemented by hardware by executing corresponding software. The hardware or software includes one or more units or modules corresponding to the functions.

In a possible design, a structure of the apparatus includes a processor, a communication interface, and a transceiver. The processor is configured to support the apparatus in performing a corresponding function in the foregoing method. The communication interface and the transceiver are configured to support communication between the apparatus and another network element. The apparatus may further include a memory. The memory is coupled to the processor, and stores a program instruction and data that are necessary to the apparatus.

According to an eighth aspect, an embodiment provides an information transmission apparatus. The apparatus can implement functions performed by the secondary base station in the method in the second aspect. The functions may be implemented by using hardware, or may be implemented by hardware by executing corresponding software. The hardware or software includes one or more units or modules corresponding to the functions.

In a possible design, a structure of the apparatus includes a processor, a communication interface, and a transceiver. The processor is configured to support the apparatus in performing a corresponding function in the foregoing method. The communication interface and the transceiver are configured to support communication between the apparatus and another network element. The apparatus may further include a memory. The memory is coupled to the processor, and stores a program instruction and data that are necessary to the apparatus.

According to a ninth aspect, an embodiment provides an information transmission apparatus. The apparatus can implement functions performed by the core network device in the method in the third aspect and/or the fourth aspect. The functions may be implemented by using hardware, or may be implemented by hardware by executing corresponding software. The hardware or software includes one or more units or modules corresponding to the functions.

In a possible design, a structure of the apparatus includes a processor and a communication interface. The processor is configured to support the apparatus in performing a corresponding function in the foregoing method. The communication interface is configured to support communication between the apparatus and another network element. The apparatus may further include a memory. The memory is coupled to the processor, and stores a program instruction and data that are necessary to the apparatus.

According to a tenth aspect, an embodiment provides an information transmission apparatus. The apparatus can implement functions performed by the user equipment in the method in the fifth aspect and/or the sixth aspect. The functions may be implemented by using hardware, or may be implemented by hardware by executing corresponding software. The hardware or software includes one or more units or modules corresponding to the functions.

In a possible design, a structure of the apparatus includes a processor and a transceiver. The processor is configured to support the apparatus in performing a corresponding function in the foregoing method. The transceiver is configured to support communication between the apparatus and another network element. The apparatus may further include a memory. The memory is coupled to the processor, and stores a program instruction and data that are necessary to the apparatus.

According to an eleventh aspect, an embodiment provides a communication system. The system includes the master base station and the secondary base station that are described in the foregoing aspects. Optionally, the system may further include the core network device described in the foregoing aspects. Optionally, the system may further include the user equipment described in the foregoing aspects.

According to a twelfth aspect, an embodiment provides a computer readable storage medium. The computer readable storage medium stores computer program code, and when the computer program code is executed by a computer, the computer implements functions of the master base station in the first aspect.

According to a thirteenth aspect, an embodiment provides a computer readable storage medium. The computer readable storage medium stores computer program code, and when the computer program code is executed by a computer, the computer implements functions of the secondary base station in the second aspect.

According to a fourteenth aspect, an embodiment provides a computer readable storage medium. The computer readable storage medium stores computer program code, and when the computer program code is executed by a computer, the computer implements functions of the core network device in the third aspect and/or the fourth aspect.

According to a fifteenth aspect, an embodiment provides a computer readable storage medium. The computer readable storage medium stores computer program code, and when the computer program code is executed by a computer, the computer implements functions of the terminal device in the fifth aspect and/or the sixth aspect.

According to a sixteenth aspect, an embodiment provides a communication chip system. The communication chip system includes at least one processor, and the at least one processor is coupled to a memory, and reads and runs an instruction stored in the memory, to implement functions of the master base station in the first aspect.

According to a seventeenth aspect, an embodiment provides a communication chip system. The communication chip system includes at least one processor, and the at least one processor is coupled to a memory, and reads and runs an instruction stored in the memory, to implement functions of the secondary base station in the second aspect.

According to an eighteenth aspect, an embodiment provides a communication chip system. The communication chip system includes at least one processor, and the at least one processor is coupled to a memory, and reads and runs an instruction stored in the memory, to implement functions of the core network device in the third aspect and/or the fourth aspect.

According to a nineteenth aspect, an embodiment provides a communication chip system. The communication chip system includes at least one processor, and the at least one processor is coupled to a memory, and reads and runs an instruction stored in the memory, to implement functions of the terminal device in the fifth aspect and/or the sixth aspect.

According to a twentieth aspect, embodiments of this application provides a computer program product. The computer program product includes computer program code, and when the computer program code is run by a master base station, the master base station performs the method according to the first aspect.

According to a twenty-first aspect, embodiments of this application provides a computer program product. The computer program product includes computer program code, and when the computer program code is run by a secondary base station, the secondary base station performs the method according to the second aspect.

According to a twenty-second aspect, embodiments of this application provides a computer program product. The computer program product includes computer program code, and when the computer program code is run by a core network device, the core network device performs the method according to the third aspect and/or the fourth aspect.

According to a twenty-third aspect, embodiments of this application provides a computer program product. The computer program product includes computer program code, and when the computer program code is run by a terminal device, the terminal device implements functions of the terminal device in the fifth aspect and/or the sixth aspect.

DESCRIPTION OF EMBODIMENTS

The following describes technical solutions of this application with reference to accompanying drawings.

Figure 1:
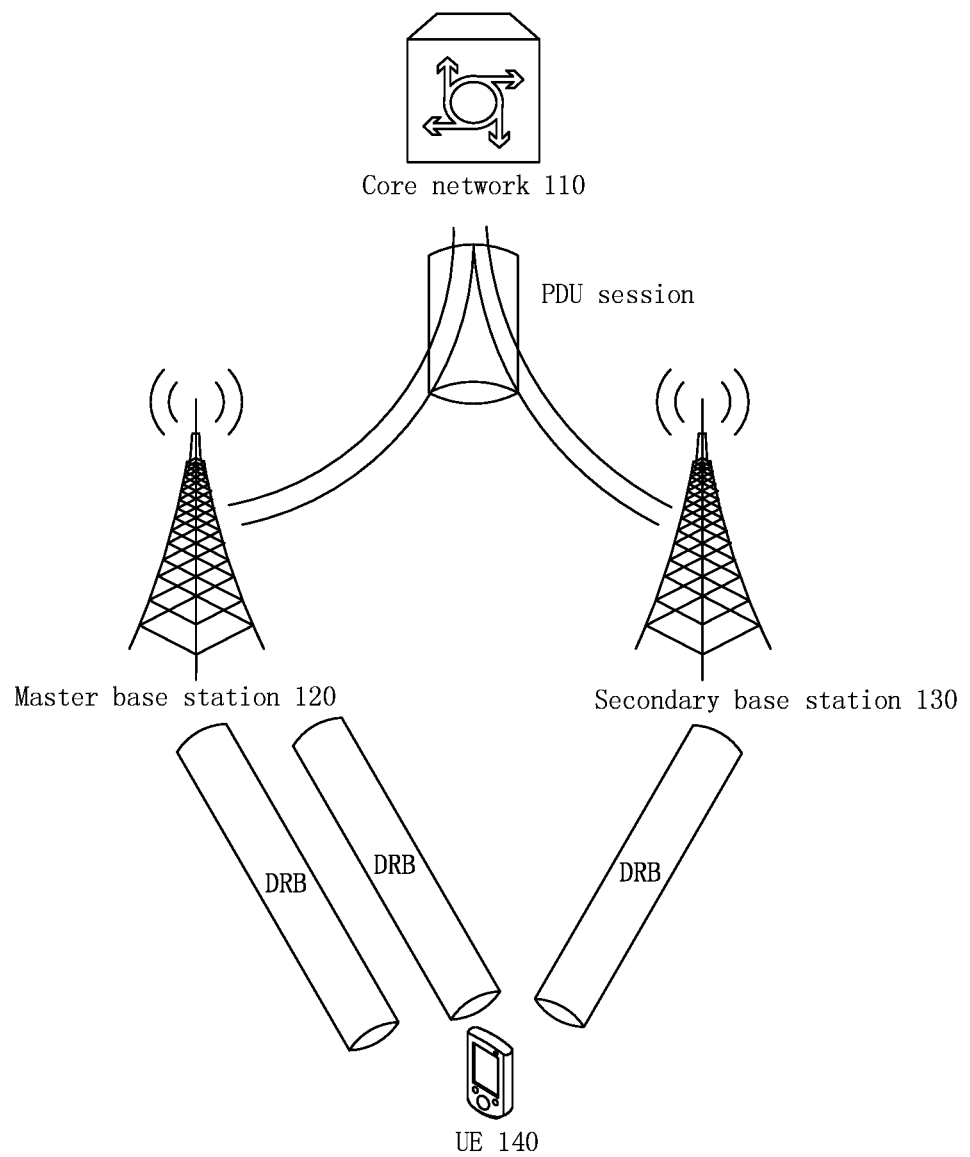
FIG. 1 is a schematic architectural diagram of a communication system in which embodiments of the application may be applied.

FIG. 1 shows a communication system in which embodiments of this application may be applied. The communication system includes a core network 110, a master base station 120, a secondary base station 130, and one or more user equipment device (referred as UE hereinafter) 140. The core network 110 separately communicates with the master base station 120 and/or the secondary base station 130 through protocol data unit (PDU) sessions. One PDU session may include a plurality of flows (as shown by lines in the figure). These flows may have a same QoS requirement, or may have different QoS requirements. The core network 110 provides a QoS requirement of a flow for the master base station 120 and/or the secondary base station 130, and the master base station 120 and/or the secondary base station 130 complete/completes mapping from the flow to a DRB. Correspondingly, flows included in one DRB have a same QoS requirement or similar QoS requirements.

When the master base station 120 determines to transfer some flows to the secondary base station 130 for transmission, the master base station 120 may send identification information of the flows to the secondary base station 130. The secondary base station 130 may map the flows to DRBs that meet QoS requirements of the flows, thereby implementing more refined QoS management on the flows.

In this application, the UE may communicate with one or more core network devices by using a radio access network. The UE may be referred to by different names such as a terminal, an access terminal, a terminal device, a subscriber unit, a subscriber station, a mobile station, a mobile console, a remote station, a remote terminal, a mobile device, a user terminal, a wireless communication device, a user agent, or a user apparatus. The access terminal may be a cellular phone, a cordless phone, a session initiation protocol (SIP) phone, a wireless local loop (WLL) station, a personal digital assistant (PDA), a handheld device with wireless communication functions, a computing device or another processing device connected to a wireless modem, an in-vehicle device, a wearable device, and user equipment in a 5G system. The 5G system includes, for example, a new radio (NR) system and an evolved LTE (eLTE) system. The eLTE system is an LTE system that is connected to a core network of the 5G system, and the eLTE system supports new characteristics of the core network of the 5G system.

In this application, the master base station or the secondary base station may be a base transceiver station (BTS) in a Code Division Multiple Address (CDMA) system, a NodeB (NB) in a Wideband Code Division Multiple Access (WCDMA) system, an evolved NodeB (eNB) in an LTE system, or a gNB in an NR system. The foregoing base stations are merely examples. The master base station or the secondary base station may alternatively be a relay station, an access point, an in-vehicle device, a wearable device, or another type of device. For ease of description, in this application, apparatuses that provide the wireless communication functions for the UE are collectively referred to as a base station.

In this application, a core network device may be a network element of a next generation core network (NGC), or may be a 5G core network (5G-CN) device, or may be another core network device. The NGC network element may include, for example, a control plane (CP) network element and a user plane (UP) network element. The core network device is not limited in this application, and any core network device that can perform the method described in the embodiments falls within the protection scope of this application. In addition, in this application, the "core network device" is sometimes referred to as a "core network" for short.

The foregoing communication system is merely an example. Quantity of core networks and quantity of secondary base stations in a communication system are not limited to the quantities shown in FIG. 1.

Figure 2:
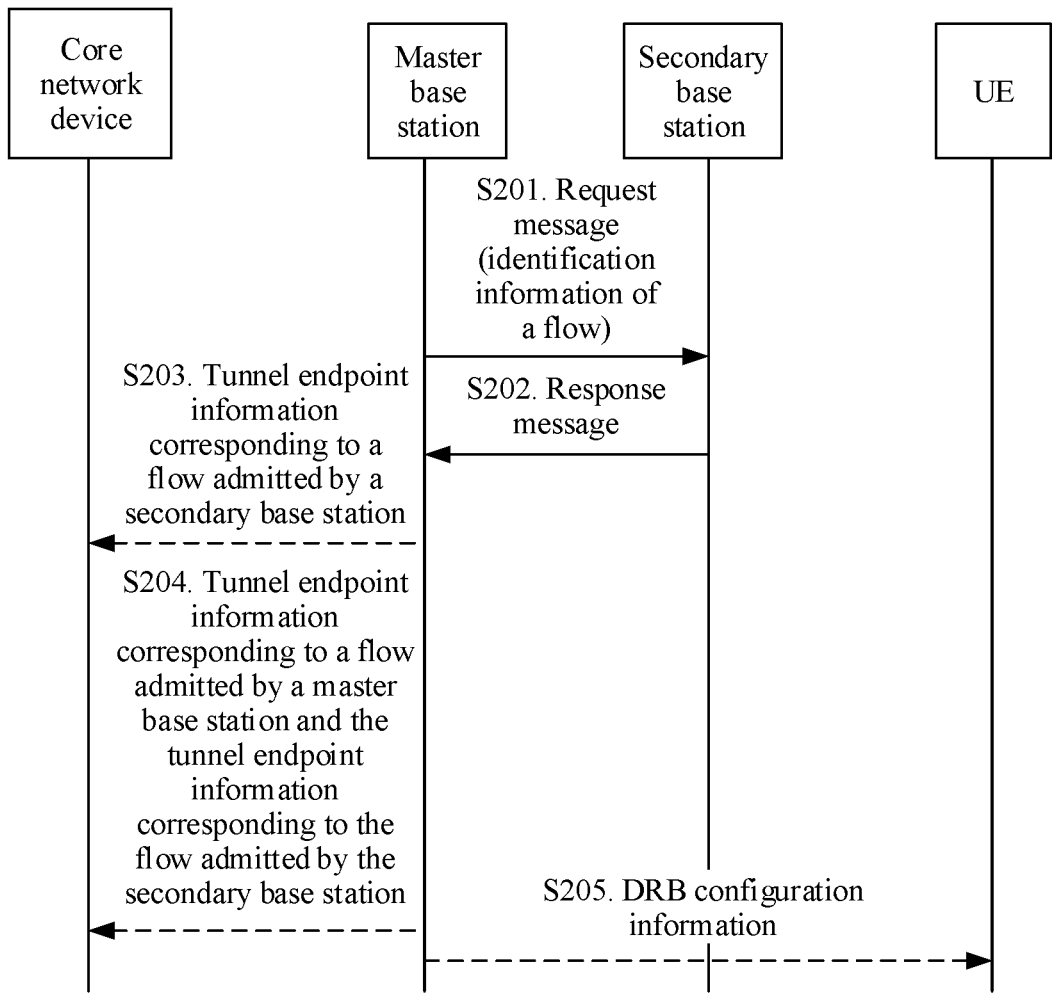
FIG. 2 is a flowchart of an information transmission method according to an embodiment of this application.

FIG. 2 is a flow diagram of an information transmission method according to an embodiment of the application. As shown in FIG. 2, the method includes the following steps.

S201. A master base station sends a request message to a secondary base station, where the request message includes identification information of a flow, or the request message includes identification information of a flow plus a mapping relationship between the flow and a DRB.

S202. The master base station receives, from the secondary base station, a response message in response to the request message.

In this embodiment, when the master base station determines to transfer a set of flows (which includes at least one flow) to the secondary base station (for ease of description, the set of flows is referred to as a "first flow"), the master base station sends a request message to the secondary base station. For example, the request message may be a secondary base station addition request message, and the request message is used to request the secondary base station to allocate, to the first flow, a resource used to transmit the first flow. For example, the request message may be signaling, or may be a data packet.

The request message includes identification information of at least one flow in the first flow, and the identification information of the at least one flow in the first flow is used to identify the at least one flow in the first flow. The secondary base station determines the first flow based on the identification information. If the secondary base station admits the first flow, the secondary base station may determine a mapping relationship between the first flow and one or more DRBs, so that the secondary base station may map the at least one flow in the first flow to the DRBs.

Alternatively, in addition to the identification information of the first flow, the request message may further include a mapping relationship between the first flow and one or more DRBs that is determined by the master base station. The secondary base station determines the first flow based on the identification information of the first flow. If the secondary base station admits the first flow, the secondary base station maps the first flow to one or more DRBs based on the mapping relationship between the first flow and the DRBs.

In this application, when the first flow includes two or more flows, the at two or more flows may belong to a same PDU session, or may belong to different PDU sessions. The secondary base station may admit all flows in the first flow, or may admit some flows in the first flow. A flow that is admitted by the secondary base station may be a flow that is successfully established or modified by the secondary base station. Specifically, the flow may be a flow of a corresponding DRB configuration that is successfully established or modified by the secondary base station.

According to the information transmission method provided in this embodiment, the master base station sends, to the secondary base station, identification information of one or more flows, or the master base station sends, to the secondary base station, identification information of one or more flows and a mapping relationship between each flow and a DRB. The secondary base station maps flows to different DRBs based on QoS requirements of the flows, thereby implementing QoS management with smaller granularity.

Optionally, the identification information of the first flow includes one or more QoS marks of the first flow.

The master base station may directly use the one or more QoS marks of the first flow to identify the one or more flows in the first flow. Alternatively, the master base station may map the QoS marks to the identification information of one or more flows in the first flow, and in this case, the master base station further needs to notify the secondary base station and the UE of a mapping relationship between the QoS marks and the identification information of one or more flows in the first flow. That the QoS marks are mapped to the identification information of one or more flows in the first flow may be as follows: For example, indexes of received QoS marks are sorted in sequence, where an index number of a QoS mark is an identifier of a flow in the first flow. The foregoing method is merely an example for description. This embodiment is not limited thereto. Any method for identifying a flow in the first flow based on a QoS mark of the flow falls within the protection scope of this application.

According to the information transmission method provided in this embodiment, the master base station uses the QoS marks of the first flow as the identification information of the first flow, so that different flows in the first flow can be directly distinguished, and QoS management with smaller granularity is implemented.

Optionally, the identification information of the first flow includes identifiers of one or more PDU sessions to which the first flow belongs.

For example, when the first flow includes two flows that belong to different PDU sessions, and the two flows have a same QoS mark, the master base station may separately map, to identifiers of the two flows, identifiers of the PDU sessions to which the two flows belong. Alternatively, the master base station may directly use the identifiers of the PDU sessions to which the two flows belong as the identification information of the first flow. The master base station may also use the QoS mark of each of the two flows and the identifiers of the PDU sessions to which the two flows belong as the identification information of the first flow. The master base station maps, to an identifier of a flow, the QoS mark of the two flows and an identifier of a PDU session to which the flow belongs. In this mapping case, the master base station needs to notify the secondary base station and the UE of the mapping relationship. The foregoing method is merely an example for description. This embodiment is not limited thereto. Any method for identifying the first flow based on the identifier of the PDU session to which the first flow belongs falls within the protection scope of this application.

Therefore, according to the information transmission method provided in this embodiment, the master base station uses the identifier of the PDU session to which the first flow belongs as the identification information of the first flow. The master base station may also use the QoS marks of the first flow and the identifiers of the one or more PDU sessions to which the first flow belongs as the identification information of the first flow, so that different flows can be directly distinguished, and QoS management with smaller granularity is implemented.

Optionally, the request message further includes QoS characteristic information of the first flow.

The QoS characteristic information includes at least one group of QoS characteristics. One group of QoS characteristics is a specific QoS requirement, and the QoS requirement may be, for example, a packet loss rate, a delay, and a priority. Each QoS mark is corresponding to one group of QoS characteristics.

According to the information transmission method provided in this embodiment, the master base station sends the QoS characteristic information of the first flow to the secondary base station, so that the secondary base station can determine a QoS requirement of the first flow for one or more DRBs based on the QoS characteristic information of the first flow.

Optionally, the request message further includes one or more identifiers of DRBs available to the secondary base station.

In this embodiment, the master base station may determine one or more DRBs to which the first flow is mapped, and indicate the mapping relationship between the first flow and the DRBs to the secondary base station by using indication information. The master base station may not perform mapping from the first flow to the DRBs, but indicates, to the secondary base station, one or more DRB identifiers to which the first flow can be mapped, and the secondary base station performs mapping from the first flow to the DRBs. For example, the master base station may send, to the secondary base station, an identifier list of DRBs available to the first flow, and the secondary base station determines identifiers of to-be-used DRBs. The foregoing method is merely an example for description. This embodiment is not limited thereto.

Therefore, according to the information transmission method provided in this embodiment, the master base station sends, to the secondary base station, one or more identifiers of DRBs available to the secondary base station. The secondary base station may map the first flow to the DRBs based on the one or more DRB identifiers available to the secondary base station, to avoid a conflict between a DRB mapped by the master base station and a DRB mapped by the secondary base station, and reduce load of the master base station.

Optionally, the request message further includes one or more identifiers of DRBs unavailable to the secondary base station.

The master base station may send, to the secondary base station, the identifiers of DRBs unavailable to the secondary base station. For example, the master base station may send, to the secondary base station, an identifier list of DRBs unavailable to the first flow. For example, the master base station may indicate, to the secondary base station, an identifier of a DRB that is used by the master base station, to avoid a conflict between a DRB mapped by the master base station and a DRB mapped by the secondary base station, and reduce load of the master base station.

The foregoing method is merely an example for description. This embodiment is not limited thereto. For example, the master base station may further send, to the secondary base station, an identifier of a DRB that is available to the first flow and an identifier of a DRB that is unavailable to the first flow. The two identifiers may be sent to the secondary base station in two lists, or may be sent to the secondary base station in one list, and identifiers of different types of DRBs in one list may be distinguished by using identifier bits.

The foregoing information included in the request message is merely an example for description, and should not be regarded as a limitation on this embodiment. The request message may further include other information. For example, the request message may further include tunnel endpoint information of the PDU session to which the first flow belongs on a core network node. The tunnel endpoint information may be a general packet radio service (GPRS) tunneling protocol (GTP) tunnel endpoint identifier (GTP-TEID) and a transport layer address, or may be tunnel endpoint information based on a power over Ethernet (PoE) protocol, or may be tunnel endpoint information based on another transport layer protocol. This is not limited in this embodiment.

In S202, after receiving the request message sent by the master base station, the secondary base station performs configuration, and sends, to the master base station, the response message in response to the request message (for example, the response message may be a secondary base station addition request response message). The response message indicates a result of processing performed by the secondary base station on the first flow. For example, when the secondary base station determines to reject the first flow, the response message may include a bit indicating that the first flow is rejected, or the response message may include indication information used to indicate that a resource allocated to the first flow is 0. When the secondary base station determines to admit the first flow, the response message may indicate a resource allocated by the secondary base station to the first flow. For another example, the response message includes two lists. One list includes information about a flow in the first flow that is admitted by the secondary base station, and the other list includes information about a flow in the first flow that is rejected by the secondary base station.

Optionally, the response message includes identification information of a flow admitted by the secondary base station and tunnel endpoint information corresponding to the flow admitted by the secondary base station.

When the secondary base station determines to admit the first flow, if the secondary base station admits some flows in the first flow, the response message includes identification information of the admitted flows in the first flow and tunnel endpoint information corresponding to the admitted flows. Optionally, if the secondary base station admits all flows in the first flow, the response message may indicate, according to one bit, that the secondary base station admits all the flows in the first flow, or may send identification information of the admitted flows in the first flow to the master base station.

Therefore, the master base station may determine, based on the response message, a flow that can be split to the secondary base station.

Optionally, the response message includes identification information of a flow that is not admitted by the secondary base station.

If the secondary base station admits some flows in the first flow, the response message may include identification information of a flow that is not admitted by the secondary base station in the first flow, so that the master base station can determine, based on the response message, a flow that can be split to the secondary base station. The foregoing method is merely an example for description. This embodiment is not limited thereto. For example, the response message may include all the identification information of the flow admitted by the secondary base station, the tunnel endpoint information corresponding to the flow admitted by the secondary base station, and the identification information of the flow rejected by the secondary base station.

Information included in the response message is merely an example for description, and should not be regarded as a limitation on this embodiment. The foregoing response message may further include other information.

For example, the response message may further include tunnel endpoint information of the PDU session to which the first flow belongs on the secondary base station. The tunnel endpoint information may be a GTP-TEID and a transport layer address, or may be tunnel endpoint information based on a PoE protocol, or may be tunnel endpoint information based on another transport layer protocol. This is not limited in this embodiment.

For another example, when the secondary base station determines the mapping relationship between the first flow and one or more DRBs, the response message further includes indication information indicating the mapping relationship.

For another example, when the master base station determines the mapping relationship between the first flow and one or more DRBs, the response message further includes information about an admitted DRB and information about a rejected DRB. Information about a DRB includes an identifier of the DRB.

The response message may include all information described above, or may include only a part of information described above.

Optionally, in an implementation of this embodiment, the method further includes:

S203. The master base station sends, to a core network device, identification information of a flow admitted by the secondary base station and tunnel endpoint information corresponding to the flow admitted by the secondary base station.

Alternatively, the method further includes: S204. The master base station sends, to a core network device, identification information of a flow admitted by the master base station, tunnel endpoint information corresponding to the flow admitted by the master base station, identification information of a flow admitted by the secondary base station, and tunnel endpoint information corresponding to the flow admitted by the secondary base station.

In this embodiment, the master base station sends, to the core network device, tunnel endpoint information corresponding to flows admitted by base stations (including the master base station and the secondary base station) in flows included in a PDU session on the base stations. The tunnel endpoint information corresponding to the base stations may be carried in a session setup reply message, or may be carried in a session modification indication message.

S203 and S204 are two optional execution steps, in other words, the master base station may perform S203 or S204.

When both tunnel endpoint information corresponding to the master base station and tunnel endpoint information corresponding to the secondary base station are carried in the session setup reply message, to be specific, in a scenario in which S204 can be performed, the session setup reply message is used to indicate a setup status of a PDU session. The session setup reply message includes at least one piece of information about a PDU session that is successfully set up and information about a PDU session that is not successfully set up. For example, the information about the PDU session that is successfully set up includes an identifier of the PDU session, a QoS mark, and GTP-TEIDs and transport layer addresses of a flow identified by the QoS mark on the base stations (including the master base station and the secondary base station). Optionally, the session setup reply message further includes identifiers of the base stations. Optionally, the session setup reply message may include only the identification information of the flow admitted by the secondary base station and the tunnel endpoint information corresponding to the flow admitted by the secondary base station.

When the tunnel endpoint information corresponding to the secondary base station is carried in the session modification indication message, in a scenario in which S203 is performed, the session modification indication message is used to instruct the core network device to migrate, to the secondary base station, the flow admitted by the secondary base station in the first flow. For example, the session modification indication message includes a QoS mark, and a GTP-TEID and a transport layer address of a flow identified by the QoS mark on the secondary base station. Optionally, the session modification indication message may further include an identifier of a PDU session to which the flow identified by the QoS mark belongs. If the entire PDU session is migrated to the secondary base station, the session modification indication message may include only the identifier of the PDU session, and a GTP-TEID and a transport layer address of the PDU session on the secondary base station.

According to the information transmission method provided in this embodiment, the base station sends, to the core network device, tunnel endpoint information corresponding to a flow included in the PDU session on the secondary base station. Alternatively, the base station sends, to the core network device, tunnel endpoint information corresponding to a flow included in the PDU session on the master base station and tunnel endpoint information corresponding to the flow included in the PDU session on the secondary base station. As a result, a bearer can be created and transferred based on flow information.

Optionally, in an implementation of this embodiment, the method further includes:

S205. The master base station sends DRB configuration information to a UE, where the DRB configuration information includes a DRB identifier and identification information of a flow corresponding to the DRB.

The DRB configuration information includes identification information of a flow corresponding to each of DRBs respectively corresponding to the master base station and the secondary base station, to be specific, the DRB configuration information indicates DRBs to be established on the master base station and DRBs to be established on the secondary base station.

After receiving the response message from the secondary base station, or after sending the session setup reply message or the session modification indication message to the core network, the master base station sends a radio resource control (RRC) connection reconfiguration message to the UE. The RRC connection reconfiguration message includes the foregoing DRB configuration information.

According to the information transmission method provided in this embodiment, the UE may receive data (namely, a flow) from at least one of the master base station and the secondary base station based on the DRB configuration information, and a bearer can be created and transferred based on flow information.

Optionally, before the master base station sends the request message to the secondary base station, the method further includes:

S206. The master base station receives a flow identifier from the UE.

S207. The master base station establishes, based on the flow identifier, a bearer for a flow indicated by the flow identifier.

The flow identifier is used to indicate the flow, and a specific form of the flow identifier is not limited in this application. When the UE has to-be-uploaded data and cannot determine a mapping relationship between a flow and a DRB, the UE may send a flow identifier corresponding to the data to a base station (including the master base station or the secondary base station). The base station performs mapping from a flow to a DRB for the flow indicated by the flow identifier. How the user equipment determines the flow identifier corresponding to the data is not limited in this application.

In an optional implementation, the flow identifier may be carried in an RRC request message. After receiving the RRC request message, the base station triggers an establishment process of the bearer corresponding to the flow identifier. The bearer may be a bearer established only on the master base station, or may be a bearer established only on the secondary base station, or may be a split bearer established on both the master base station and the secondary base station.

In another optional implementation, the flow identifier may be sent to the base station together with uplink data. The base station triggers, based on a preset command in the base station, an establishment process of the bearer corresponding to the flow identifier. The bearer may be a bearer on the master base station, or may be a bearer on the secondary base station, or may be a split bearer.

When the base station determines to establish the bearer for the UE, the base station may perform the foregoing processes of S201 and S202 and another process used to establish a bearer for the UE in this application. Details are not described herein again.

According to the information transmission method provided in this embodiment, the base station establishes, based on the flow identifier received from the UE, the bearer for the flow indicated by the flow identifier. Therefore, a bearer can be created and transferred based on flow information, and a requirement of a 5G communication system for QoS management of information transmission can be met.

The information transmission method provided in this application is separately described from a perspective of a base station, a core network, and a terminal device in the foregoing embodiment. The following further describes the embodiments in detail based on a common aspect of the embodiment described above.

Figure 3:
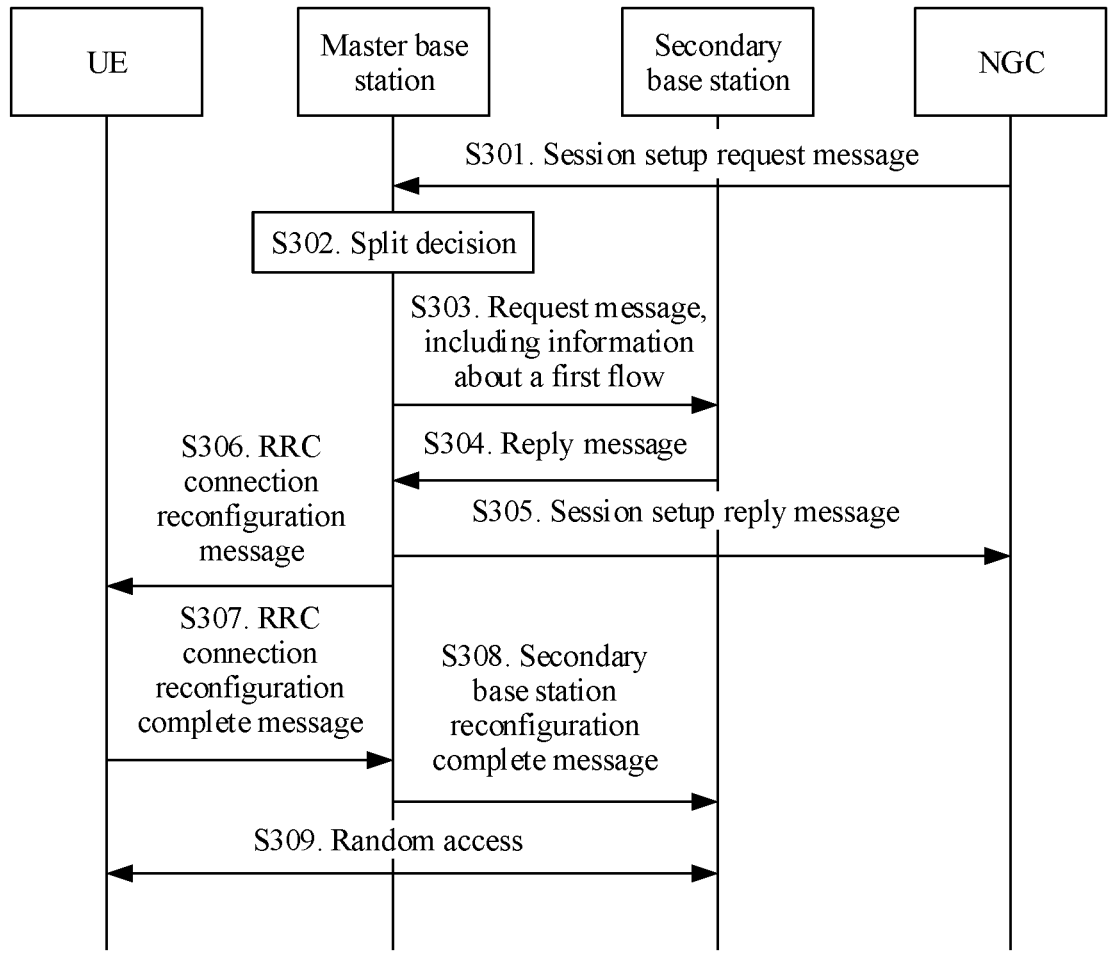
FIG. 3 is a flowchart of an information transmission method according to another embodiment of this application.

FIG. 3 is a flowchart of an information transmission method according to another embodiment of the application. As shown in FIG. 3, the method includes the following steps.

S301. An NGC sends a session setup request message to a master base station, where the session setup request message carries at least one piece of PDU session information. Specifically, the PDU session information includes an identifier of a PDU session, a GTP-TEID, a transport layer address, and a NAS-level QoS description, and the NAS-level QoS description includes a QoS characteristic and a QoS mark. The GTP tunnel endpoint identifier and the transport layer address are used to identify an endpoint of the PDU session at a core network node on a next generation (NextGen, NG) interface. In this case, information elements included in the session setup request message may be shown in Table 1, or may be in another form. This is not limited in this application.

TABLE 1

| PDU session to be setup list |
| --- |
| >PDU session to be setup item IEs |
| >>PDU session ID |
| >>Transport Layer address |

TABLE 1-continued

| PDU session to be setup list |
| --- |
| >>GTP-TEID |
| >>NAS-level QoS profile item IEs |
| >>>QoS marking |
| >>>QoS characteristic |

In Table 1, "PDU session to be setup list" indicates "a list of PDU sessions that are to be set up". "PDU session to be setup item IEs" indicates "information elements included in the list of PDU sessions that are to be set up". IE is short for information element. "PDU session ID" indicates "an identifier of a PDU session". ID is short for identification, "Transport Layer address" indicates "a transport layer protocol". "GTP-TEID" indicates "a GTP tunnel endpoint identifier". "NAS-level QoS profile item IEs" indicates "information elements included in the NAS-level QoS description". "QoS characteristic" indicates "a QoS characteristic", and "QoS marking" indicates "a QoS mark".

In Table 1, the NAS-level QoS description is used for QoS control, and data packets marked with a same QoS mark have a same QoS requirement. For a base station, different QoS marks identify different flows. In addition, one PDU session may include a plurality of flows, and at least one PDU session may be set up in one PUD session setup process.

S302. After receiving the session setup request message, the master base station determines to transfer some or all flows corresponding to the session setup request message to a secondary base station for transmission (to be specific, the master base station makes a split decision). Optionally, the master base station may map the QoS mark to an identifier of a flow. Alternatively, the master base station may directly use the QoS mark to identify the flow, and in this case, an identifier of the flow is the QoS mark. In this application, when both "an identifier of a flow" and "identification information of a flow" are used to indicate the flow, the two may be used interchangeably.

If the QoS mark is not unique between PDU sessions, to be specific, the PDU sessions may have the same QoS mark, a QoS mark of a flow and a PDU session identifier of a PDU session to which the flow belongs may be mapped to an identifier of the flow. Alternatively, a QoS mark of a flow and a PDU session identifier of a PDU session to which the flow belongs are used to identify the flow, and in this case, an identifier of the flow is the QoS identifier and the PDU session identifier. In this application, the identifier of the flow may be any one of the foregoing cases.

S303. The master base station sends a secondary base station addition request message to the secondary base station, where the message carries at least one piece of flow information. The flow information may include a QoS mark of a flow, a QoS characteristic of the flow, a GTP tunnel identifier and a transport layer address of a PDU session to which the flow belongs on a core network node, and optionally, may further include an identifier of the PDU session. In this case, a specific information element design may be described in Table 2 and Table 3, or may be in another form. This is not limited in this application.

TABLE 2

| PDU session to be split list |
|---|
| >PDU session to be split item IEs<br>>>PDU session ID<br>>>Transport Layer address<br>>>GTP-TEID<br>>>Flow to be spit item IEs<br>>>>QoS marking<br>>>>QoS characteristic |

TABLE 3

| Flow to be split list |
|---|
| >flow to be split item IEs<br>>>QoS marking<br>>>QoS characteristic<br>>>PDU session ID<br>>>Transport Layer address<br>>>GTP-TEID |

In Table 2, "PDU session to be split list" indicates "a list of PDU sessions to which split flows belong", and "PDU session to be split item IEs" indicates "information elements included in the list of PDU sessions to which split flows belong". Meanings of remaining information elements are shown in Table 1. Details are not described herein again.

In Table 3, "Flow to be split list" indicates "a list of to-be-split flows", and "flow to be split item IEs" indicates "information elements included in the list of to-be-split flows". Meanings of remaining information elements are shown in Table 1 and Table 2. Details are not described herein again.

If the master base station performs mapping from the flow to a DRB, a mapping relationship between the DRB and the flow is also carried in the message. In this case, at least one flow may be mapped to one DRB, and the at least one flow may belong to a same PDU session, or may belong to different PDU sessions. In this case, an information element design may be shown in Table 4 to Table 6, or may be in another form. This is not limited in this application. A PDU session identifier is optional.

TABLE 4

| DRB to be split list |
|---|
| >DRB to be split item IEs<br>>>DRB ID<br>>>PDU session ID<br>>>Transport Layer address<br>>>GTP-TEID<br>>>Flow to be spit item IEs<br>>>>QoS marking<br>>>>QoS characteristic |

TABLE 5

| DRB to be split list |
|---|
| >DRB to be split item IEs<br>>>DRB ID<br>>>flow to be split item IEs<br>>>>QoS marking<br>>>>QoS characteristic<br>>>>PDU session ID<br>>>>Transport Layer address<br>>>>GTP-TEID |

TABLE 6

| DRB to be split list |
|---|
| >DRB to be split item IEs<br>>>DRB ID<br>>>tunnel endpoint item IEs<br>>>>PDU session ID<br>>>>Transport Layer address<br>>>>GTP-TEID<br>>>>QoS marking<br>>>>QoS characteristic |

In Table 4, "DRB to be split list" indicates "a list of DRBs corresponding to split flows", and "DRB to be split item IEs" indicates "information elements included in the list of DRBs corresponding to split flows". "DRB ID" indicates "a DRB identifier", and meanings of remaining information elements are shown in Table 1 to Table 3. Details are not described herein again.

In Table 5, meanings of information elements are shown in Table 1 to Table 4. Details are not described herein again.

In Table 6, "tunnel endpoint item IEs" indicates "information elements included in a tunnel endpoint", and meanings of remaining information elements are shown in Table 1 to Table 5. Details are not described herein again.

If the master base station does not perform mapping from a flow to a DRB for the flow to be split to the secondary base station, but the secondary base station performs the mapping, in this case, to avoid a conflict occurs in DRBs, the master base station needs to send an indication to the secondary base station. The indication is used to indicate a DRB identifier that can be configured for the secondary base station. Optionally, the indication information may be an identifier list of DRBs configured on a master base station side, or may be an identifier list of available DRBs allocated by the master base station to the secondary base station, or may be another identifier list of DRBs. This is not limited in this application.

S304. After receiving the request from the master base station, the secondary base station performs configuration, and returns a secondary base station request reply message to the master base station. If the master base station does not add, to the request message, a DRB identifier corresponding to the flow, the secondary base station request reply message carries flow information of an admitted and split flow, and may further carry information about a rejected flow. Specifically, the flow information of the split flow admitted by the secondary base station includes at least an identifier of the flow, and a GTP tunnel identifier and a transport layer address of a PDU session in which the flow is located on the secondary base station. Optionally, the message may further include an identifier of the PDU session. A mapping relationship between the flow and a DRB is determined by the secondary base station, and the mapping relationship between the flow and the DRB may also be carried in the message. The information about the flow rejected by the secondary base station includes at least an identifier of the flow.

If the master base station adds a mapping relationship between the flow and the DRB to the request message, the secondary base station adds information about a DRB corresponding to an admitted and split flow to the message, and may further add information about a rejected DRB to the message. Specifically, the information about the DRB corresponding to the split flow admitted by the secondary base station may include an identifier of the DRB. If flows in the DRB belong to only one PDU session, the information about the DRB further includes a GTP tunnel identifier and a transport layer address of the PDU session to which the flows in the DRB belong on the secondary base station. If flows in the DRB belong to different PDU sessions, the information about the DRB further includes an identifier of a flow, and a GTP tunnel identifier and a transport layer address of a PDU session in which the flow is located on the secondary base station. The information about the DRB rejected by the secondary base station includes at least a DRB ID. The secondary base station may admit only some flows in the DRB, and in this case, the information about the rejected DRB further includes an identifier of a rejected flow. Optionally, flow information of two lists may further include an identifier of a PDU session.

S305. The master base station sends a session setup reply message to the NGC, where the message carries information about a PDU session that is successfully set up, and may further carry information about a PDU session that is not successfully set up. Specifically, the information about the PDU session that is successfully set up includes an identifier of the PDU session, a QoS mark, and a GTP tunnel identifier and a transport layer address of the PDU session that carries a flow identified by the QoS mark on a base station. The base station may be the master base station, or may be the secondary base station. Optionally, the information about the PDU session that is successfully set up may further include an identifier of the base station. In this case, an information element design may be shown in Table 7, or may be in another form. This is not limited in this application.

TABLE 7

| PDU session setup list |
|---|
| >PDU session setup item IEs |
| >>PDU session ID |
| >>tunnel endpoint item IEs |
| >>>Transport layer address |
| >>>GTP-TEID |
| >>Flow item IEs |
| >>>QoS marking |

In Table 7, "PDU session setup list" indicates "a list of PDU sessions that are set up", "PDU session setup item IEs" indicates "information elements included in the list of PDU sessions that are set up", and meanings of remaining information elements are shown in Table 1 to Table 6. Details are not described herein again.

In this case, for one PDU session, a core network side may need to maintain GTP tunnel identifiers and transport layer addresses of a plurality of base station sides.

The information about the PDU session that is not successfully set up includes an identifier of the PDU session that is not successfully set up. In this case, in a PDU session, some flows may be successfully admitted by the master base station or the secondary base station, and some other flows are not admitted. In this case, the PDU session that is not successfully set up further needs to carry an identifier of a specific flow that is not admitted. For a PDU session in which none of flows is admitted, there is no need to carry a flow identifier.

S306. The master base station sends an RRC connection reconfiguration message to UE. The RRC connection reconfiguration message carries DRB configuration information on the master base station and DRB configuration information on the secondary base station. Specifically, the DRB configuration information is used to indicate, to the UE, DRBs to be established on the master base station and DRBs to be established on the secondary base station. The configuration information includes at least one of an identifier of a flow corresponding to each DRB and an identifier of a PDU session to which the flow corresponding to each DRB belongs. It should be noted that, in this case, if the identifier of the flow is not a QoS mark, a mapping relationship between the identifier of the flow and the QoS mark needs to be notified to the UE. There is no sequence between S306 and S305.

S307. After completing configuration in the RRC connection reconfiguration message, the UE sends an RRC connection reconfiguration complete message to the master base station, where the message is used to indicate, to the master base station, that the UE completes the corresponding configuration.

S308. The master base station sends a secondary base station reconfiguration complete message to the secondary base station, where the message is used to indicate, to the secondary base station, that the UE completes the corresponding configuration.

S309. The UE and the secondary base station perform random access. There is no sequence between S309 and S307.

According to the information transmission method provided in this embodiment, when initiating PDU session setup in a core network, the master base station decides to split some or all flows to the secondary base station, and sends identification information of the flows to the secondary base station. The secondary base station determines QoS requirements of the flows based on the identification information of the flows, and map the flows to a DRB that meets the QoS requirements of the flows, thereby implementing more refined QoS management on the flows.

Figure 4:
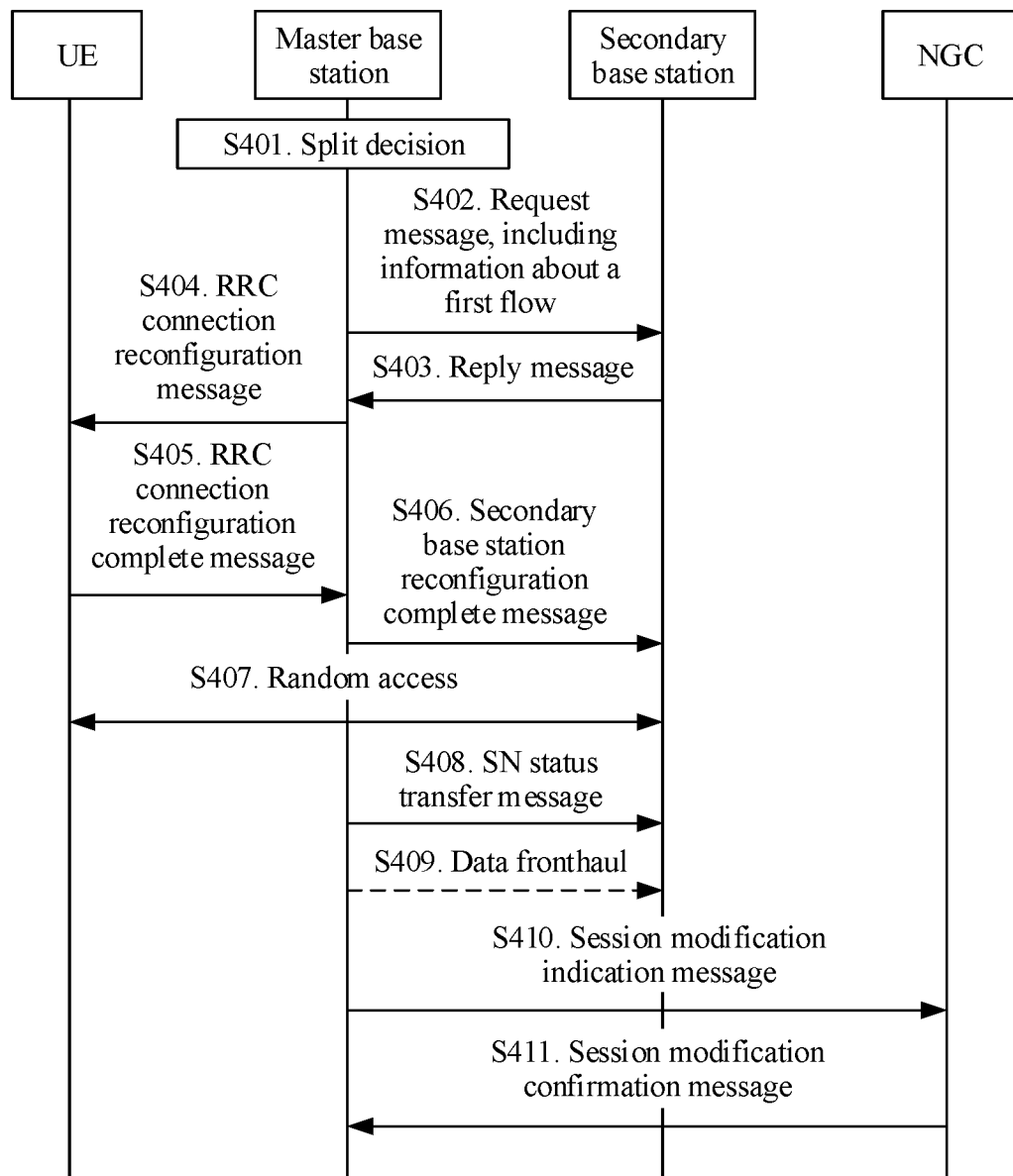
FIG. 4 is a flowchart of an information transmission method according to yet another embodiment of this application.

FIG. 4 is a flowchart of an information transmission method according to yet another embodiment of this application. As shown in FIG. 4, the method includes the following steps.

S401. A master base station decides, based on a load status and the like, to transfer some or all flows to a secondary base station.

S402. The master base station sends a secondary base station addition request message to the secondary base station, where the message carries at least one group of correspondence between a DRB and a flow, and information about the flow. Specifically, the correspondence may be that one DRB ID is corresponding to at least one flow identifier. The information about the flow includes a GTP tunnel identifier and a transport layer address of a PDU session to which the flow belongs on a core network node. Optionally, the information about the flow may further include a QoS characteristic of the flow and/or an identifier of the PDU session to which the flow belongs.

S403. The secondary base station sends a secondary base station addition request reply message to the master base station. The message carries information about a DRB corresponding to an admitted and split flow, and may further carry information about a rejected DRB. Specifically, the information about the DRB corresponding to the split flow admitted by the secondary base station may include an identifier of the DRB. If flows in the DRB belong to only one PDU session, the information about the DRB further includes a GTP tunnel identifier and a transport layer address of the PDU session to which the flows in the DRB belong on the secondary base station. If flows in the DRB belong to different PDU sessions, the information about the DRB further includes an identifier of a flow, and a GTP tunnel identifier and a transport layer address of a PDU session in which the flow is located on the secondary base station. The information about the DRB rejected by the secondary base station includes at least a DRB ID. The secondary base station may admit only some flows in the DRB, and in this case, the information about the rejected DRB further includes an identifier of a rejected flow. Optionally, flow information of two lists may further include an identifier of a PDU session.

S404. The master base station sends an RRC connection reconfiguration message to UE. The message carries DRB configuration information of a flow split from the master base station to the secondary base station. Optionally, the configuration information further indicates an identifier of a flow corresponding to a DRB.

S405. After completing configuration in the RRC connection reconfiguration message, the UE sends an RRC connection reconfiguration complete message to the master base station, where the message is used to indicate, to the master base station, that the UE completes the corresponding configuration.

S406. The master base station sends a secondary base station reconfiguration complete message to the secondary base station, where the message is used to indicate, to the secondary base station, that the UE completes the corresponding configuration.

S407. The UE and the secondary base station perform random access. There is no sequence between S407 and S405.

S408. The master base station sends a sequence number (SN) status transfer message to the secondary base station. If the DRB is configured, the master base station needs to send a corresponding sending status of the DRB to the secondary base station. An SN number written in the SN status transfer message may be a sequence number of a packet data convergence protocol (PDCP) and/or a sequence number of a flow.

S409. The master base station performs data forwarding. In this case, if each PDU session is corresponding to one tunnel between the master base station and the secondary base station, a flow identifier needs to be added to a header of a GTP field during data forwarding. A dashed line arrow in FIG. 4 indicates that S409 is an optional step.

S410. The master base station sends a session modification indication message to a core network. The message is used to instruct an NGC to transfer a corresponding flow to the secondary base station. The message carries a QoS mark, and a GTP tunnel identifier and a transport layer address of the PDU session that carries the flow identified by the QoS mark on the secondary base station. Optionally, the message may further include an identifier of a PDU session to which the flow belongs.

If an entire PDU session is transferred to the secondary base station, in this case, the message may carry only an identifier of the PDU session, and a GTP tunnel identifier and a transport layer address of the PDU session on the secondary base station. There is no sequence between S410 and S405.

S411. The core network sends a session modification confirmation message to the master base station. The session modification confirmation message is used by the master base station to confirm the modification. S411 is an optional step.

It should be noted that, in this case, the core network may modify a GTP tunnel identifier and a transport layer address of a corresponding PDU session on a core network node for the master base station or the secondary base station. If the modification is performed for the master base station, a modified GTP tunnel identifier and transport layer address may be notified to the master base station by using the session modification confirmation message. If the modification is performed for the secondary base station, an indication message needs to be additionally sent to the secondary base station, and a modified GTP tunnel identifier and transport layer address of the corresponding PDU session on the core network node are notified to the secondary base station. In this case, the message in S402 may not carry the GTP tunnel identifier and the transport layer address of the PDU session on the core network node.

According to the information transmission method provided in this embodiment, after the core network and the master base station set up a PDU session, the master base station decides to split some or all flows to the secondary base station, and sends identification information of the flows to the secondary base station. The secondary base station maps the flows to one or more DRBs that meets QoS requirements of the flows, thereby implementing more refined QoS management on the flows.

Figure 5:
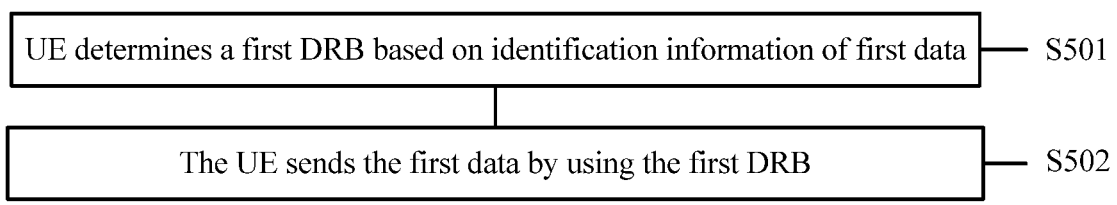
FIG. 5 is a flowchart of an information transmission method according to still another embodiment of this application.

FIG. 5 is flowchart of an information transmission method according to still another embodiment of this application. As shown in FIG. 5, the method includes the following steps.

S501. UE determines a first DRB based on identification information of first data.

S502. The UE sends the first data by using the first DRB.

In this embodiment, the first data is uplink data, the identification information of the first data includes at least one piece of information of a flow identifier (for example, a QoS mark) of the first data and an identifier of a PDU session to which the first data belongs. The UE determines, based on the identification information of the first data, a DRB corresponding to the identification information, namely, the first DRB. The first DRB may be a DRB carried by a master base station, or may be a DRB carried by a secondary base station. A correspondence between the identification information of the first data and the DRB may be information preconfigured in the UE, or may be information determined by the UE based on a correspondence between a QoS mark of a flow in downlink data and a DRB, or may be information determined by the UE in another manner.

Therefore, according to the information transmission method provided in this embodiment, the UE may determine, based on a flow identifier of uplink data and an identifier of a PDU session, a DRB that matches a QoS requirement of the uplink data, and a bearer can be created and transferred based on flow information.

Optionally, that UE determines a first DRB based on identification information of a first data includes:

S503. The UE determines that a default bearer corresponding to an identifier of a PDU session is the first DRB, where the identification information of the first data includes the identifier of the PDU session.

According to the information transmission method provided in this embodiment, the default bearer may be on the master base station, or may be on the secondary base station. The UE may determine the DRB that matches the QoS requirement of the uplink data without exchanging information with another network element, so that signaling overheads can be reduced.

When sending the uplink data by using the default bearer, the UE sends the flow identifier corresponding to the uplink data to a base station. After receiving the uplink data sent by the UE by using the default bearer, the base station may perform mapping from a flow to a DRB for uplink data subsequently sent by the UE, and notify the UE of a mapping relationship between a subsequently sent flow and a DRB. The DRB may be the foregoing default bearer, or may be a new bearer.

Optionally, that UE determines a first DRB based on identification information of first data includes:

S504. The UE sends a first request message to a base station, where the first request message includes the identification information of the first data, and the first request message is used to request the base station to perform DRB mapping for the first data.

The performing DRB mapping for the first data includes: mapping the first data to another DRB than the default bearer. The another DRB may be an existing DRB, or may be a newly created DRB. The another DRB may be a DRB on the master base station, or may be a DRB on the secondary base station.

S505. The UE receives a reply message from the base station, where the reply message includes a mapping relationship between the first data and the first DRB.

According to the information transmission method provided in this embodiment, the UE may send the first request message to the base station (the master base station or the secondary base station), where the first request message includes at least one piece of information of a QoS mark and an identifier of a PDU session. The first request message is used to request the base station to perform DRB mapping for data indicated by the QoS mark and the identifier of the PDU session. Therefore, the UE may determine the DRB that matches the QoS requirement of the uplink data, and a bearer can be created or transferred based on flow information.

Optionally, the method further includes:

S506. The UE determines the identification information of the first data based on upper layer information and non-access stratum (NAS) information.

An upper layer is an application layer of the UE, for example, an application program running on the UE. An access stratum (AS) of the UE may determine the identification information of the first data based on information from the upper layer or a NAS. The identification information of the first data includes the identifier of the PDU session corresponding to the first data and the flow identifier (for example, the QoS mark) of the first data. The AS of the UE receives the identifier of the PDU session from the upper layer, and the AS of the UE receives the flow identifier of the first data from the NAS.

Specifically, the NAS of the UE may determine the QoS mark of the data based on a packet filter. The packet filter is a policy, and is used to determine, from data that includes a plurality of characteristics, data, namely, a flow, that meets a specific rule.

The AS of the UE determines the DRB based on the identification information of the first data. If the identification information of the first data has no corresponding DRB, the AS of the UE determines the default bearer based on the identifier of the PDU session, and sends the first flow by using the default bearer.

Therefore, according to the information transmission method provided in this embodiment, the AS of the UE determines identification information of the uplink data based on the upper layer information and the NAS information, to determine, based on the identification information of the uplink data, the DRB for sending the uplink data.

The solutions provided in the embodiments are mainly described above from a perspective of interaction between network elements. To implement the foregoing functions, each network element includes a corresponding hardware structure and/or software module for executing the functions. In combination with the examples described in the embodiments disclosed in this specification, units, algorithms steps may be implemented by hardware or a combination of hardware and computer software in this application. Whether a function is performed by hardware or hardware driven by computer software depends on particular applications and design constraints of the technical solutions. Different methods may be used to implement the described functions for each particular application, but it should not be considered that the implementation goes beyond the scope of this application.

In the embodiments, functional unit division may be performed on the master base station, the secondary base station, the core network device, the UE, and the like based on the foregoing method examples. For example, each functional unit may be obtained through division based on a corresponding function, or two or more functions may be integrated into one processing unit. The integrated unit may be implemented in a form of hardware, or may be implemented in a form of a software functional unit. It should be noted that the unit division in the embodiments is an example, and is merely logical function division and may be another division manner during actual implementation.

Figure 6:
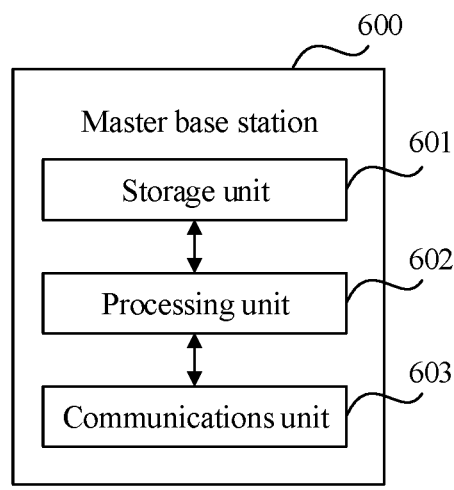
FIG. 6 is a schematic block diagram of a master base station according to an embodiment of this application.

When an integrated unit is used, FIG. 6 is a schematic block diagram of a master base station in the foregoing embodiments. A master base station 600 includes a processing unit 602 and a communication unit 603. The processing unit 602 is configured to control and manage an action of the master base station 600. For example, the processing unit 602 is configured to support, by using the communication unit 603, the master base station 600 in performing S201, S303, S402, and other processes used to perform the technologies described in this specification. The communication unit 603 is configured to support communication between the master base station 600 and another network entity, for example, communication with a secondary base station, a core network device, and UE shown in FIG. 2. The master base station 600 may further include a storage unit 601, configured to store program code and data of the master base station 600.

The processing unit 602 may be a processor or a controller, such as a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. The controller/processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The communication unit 603 may be a communication interface, a transceiver, or the like. The storage unit 601 may be a memory.

Figure 7:
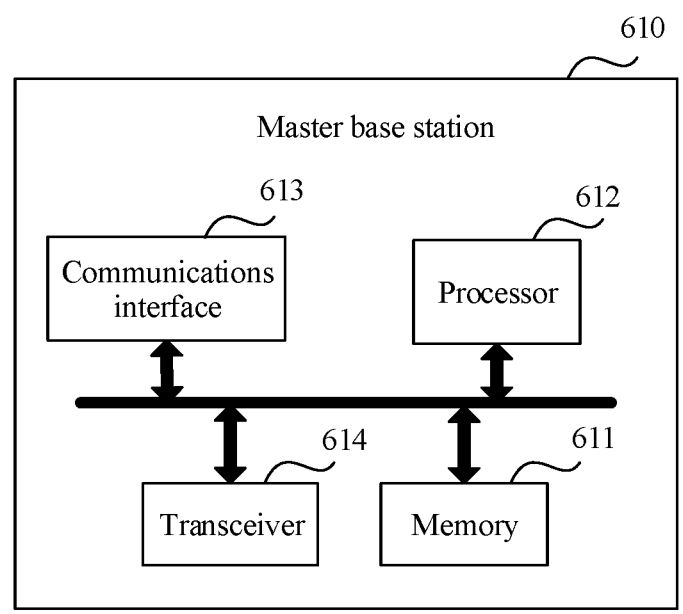
FIG. 7 is a simplified structural diagram of a master base station according to an embodiment of this application.

When the processing unit 602 is the processor, the communication unit 603 is the communication interface and the transceiver, and the storage unit 601 is the memory, the master base station in this embodiment may be a master base station shown in FIG. 7.

Referring to FIG. 7, the master base station 610 includes a processor 612, a communication interface 613, a transceiver 614, and a memory 611. The communication interface 613, the transceiver 614, the processor 612, and the memory 611 may communicate with each other by using an internal connection path, and transmit a control signal and/or a data signal. The communication interface 613 may be configured to communicate with a core network device. The transceiver 614 may be configured to communicate with UE.

For the purpose of convenient and brief description, for a detailed working process of the foregoing apparatus or unit in the master base station 610, refer to a corresponding process in the foregoing method embodiments. Details are not described herein again.

The master base station provided in this embodiment sends identification information of a flow to a secondary base station. The secondary base station determines a QoS requirement of the flow based on the identification information of the flow, and maps the flow to a DRB that meets the QoS requirement of the flow, thereby implementing more refined QoS management on data.

Figure 8:
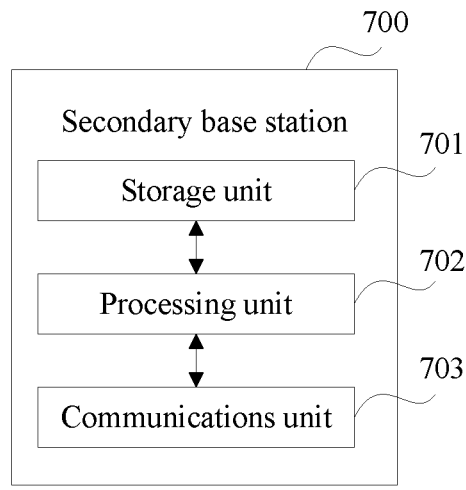
FIG. 8 is a block diagram of a secondary base station according to an embodiment of this application.

When an integrated unit is used, FIG. 8 is a schematic block diagram of a secondary base station in the foregoing embodiments. A secondary base station 700 includes a processing unit 702 and a communication unit 703. The processing unit 702 is configured to control and manage an action of the secondary base station 700. For example, the processing unit 702 is configured to support, by using the communication unit 703, the secondary base station 700 in performing S202, S304, S403, and other processes used to perform the technologies described in this specification. The communication unit 703 is configured to support communication between the secondary base station 700 and another network entity, for example, communication with a master base station, a core network device, and UE shown in FIG. 2. The secondary base station 700 may further include a storage unit 701, configured to store program code and data of the secondary base station 700.

The processing unit 702 may be a processor or a controller, for example, may be a CPU, a general-purpose processor, a DSP, an ASIC, an FPGA or another programming logical device, a transistor logic device, a hardware component, or any combination thereof. The controller/processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The communication unit 703 may be a communication interface, a transceiver, or the like. The storage unit 701 may be a memory.

Figure 9:
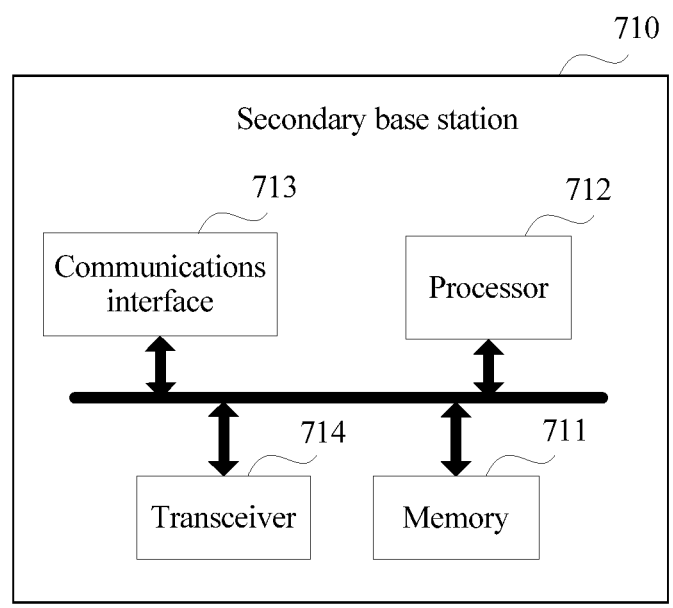
FIG. 9 is a simplified structural diagram of a secondary base station according to an embodiment of this application.

When the processing unit 702 is the processor, the communication unit 703 is the communication interface and the transceiver, and the storage unit 701 is the memory, the secondary base station in this embodiment may be a secondary base station shown in FIG. 9.

Referring to FIG. 9, the secondary base station 710 includes a processor 712, a communication interface 713, a transceiver 714, and a memory 711. The communication interface 713, the transceiver 714, the processor 712, and the memory 711 may communicate with each other by using an internal connection path, and transmit a control signal and/or a data signal. The communication interface 713 may be configured to communicate with a core network device. The transceiver 714 may be configured to communicate with UE.

For the purpose of convenient and brief description, for a detailed working process of the foregoing apparatus or unit in the secondary base station 710, refer to a corresponding process in the foregoing method embodiments. Details are not described herein again.

The secondary base station provided in this embodiment receives identification information of a flow sent by a master base station, to determine a QoS requirement of the flow based on the identification information of the flow, and map the flow to a DRB that meets the QoS requirement of the flow, thereby implementing more refined QoS management on data.

Figure 10:
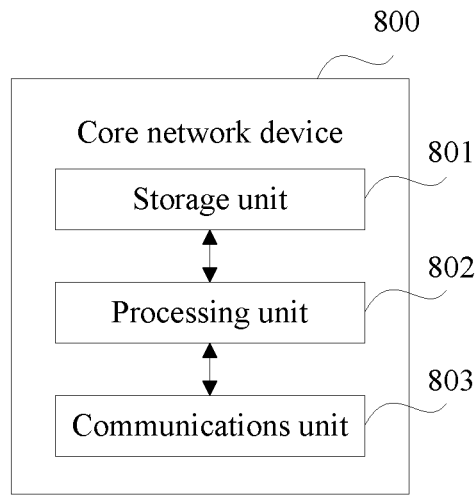
FIG. 10 is a block diagram of a core network device according to an embodiment of this application.

When an integrated unit is used, FIG. 10 is a simplified structural diagram of a core network device in the foregoing embodiments. A core network device 800 includes a processing unit 802 and a communication unit 803. The processing unit 802 is configured to control and manage an action of the core network device 800. For example, the processing unit 802 is configured to support, by using the communication unit 803, the core network device 800 in performing receiving processes corresponding to S203 and S204 and other processes used to perform the technologies described in this specification. The communication unit 803 is configured to support communication between the core network device 800 and another network entity, for example, communication with a master base station and a secondary base station shown in FIG. 2. The core network device 800 may further include a storage unit 801, configured to store program code and data of the core network device 800.

The processing unit 802 may be a processor or a controller, for example, may be a CPU, a general-purpose processor, a DSP, an ASIC, an FPGA or another programming logical device, a transistor logic device, a hardware component, or any combination thereof. The controller/processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The communication unit 803 may be a communication interface, or the like. The storage unit 801 may be a memory.

Figure 11:
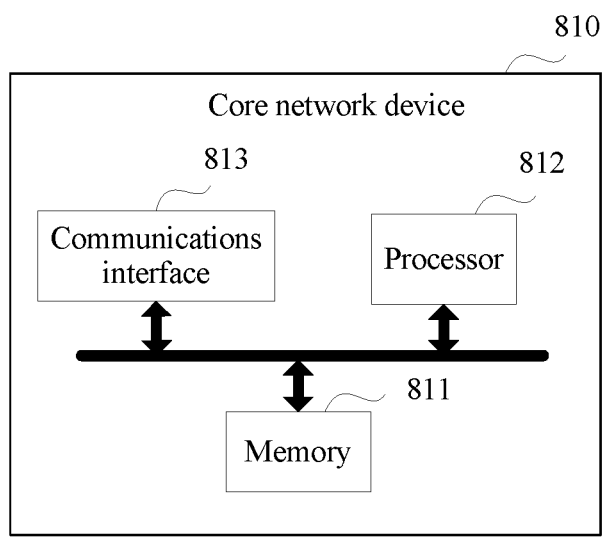
FIG. 11 is a simplified structural diagram of a core network device according to an embodiment this application.

When the processing unit 802 is the processor, the communication unit 803 is the communication interface, and the storage unit 801 is the memory, the core network device in this embodiment may be a core network device shown in FIG. 11.

Referring to FIG. 11, the core network device 810 includes a processor 812, a communication interface 813, and a memory 811. The communication interface 813, the processor 812, and the memory 811 may communicate with each other by using an internal connection path, and transmit a control signal and/or a data signal. The communication interface 813 may be configured to communicate with a master base station and a secondary base station.

For the purpose of convenient and brief description, for a detailed working process of the foregoing apparatus or unit in the core network device 810, refer to a corresponding process in the foregoing method embodiments. Details are not described herein again.

The core network device provided in this embodiment sends flows to the master base station and the secondary base station based on tunnel endpoint information corresponding to flows on the master base station and tunnel endpoint information corresponding to flows on the secondary base station. The two pieces of tunnel endpoint information are received from the master base station. Based on tunnel endpoint information that is received from the master base station and that is corresponding to a flow migrated to the secondary base station on the secondary base station, a bearer can be created and transferred based on flow information.

Figure 12:
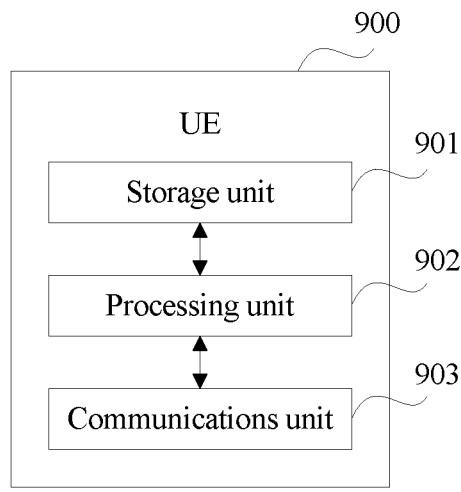
FIG. 12 is a block diagram of a user equipment device according to an embodiment this application.

When an integrated unit is used, FIG. 12 is a block diagram of a UE in the foregoing embodiments. UE 900 includes a processing unit 902 and a communication unit 903. The processing unit 902 is configured to control and manage an action of the UE 900. For example, the processing unit 902 is configured to support, by using the communication unit 903, the UE 900 in performing S501 and S502 and other processes used to perform the technologies described in this specification. The communication unit 903 is configured to support communication between the UE 900 and another network entity, for example, communication with a master base station and a secondary base station shown in FIG. 2. The UE 900 may further include a storage unit 901, configured to store program code and data of the UE 900.

The processing unit 902 may be a processor or a controller, for example, may be a CPU, a general-purpose processor, a DSP, an ASIC, an FPGA or another programming logical device, a transistor logic device, a hardware component, or any combination thereof. The controller/processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The communication unit 903 may be a transceiver, or the like. The storage unit 901 may be a memory.

Figure 13:
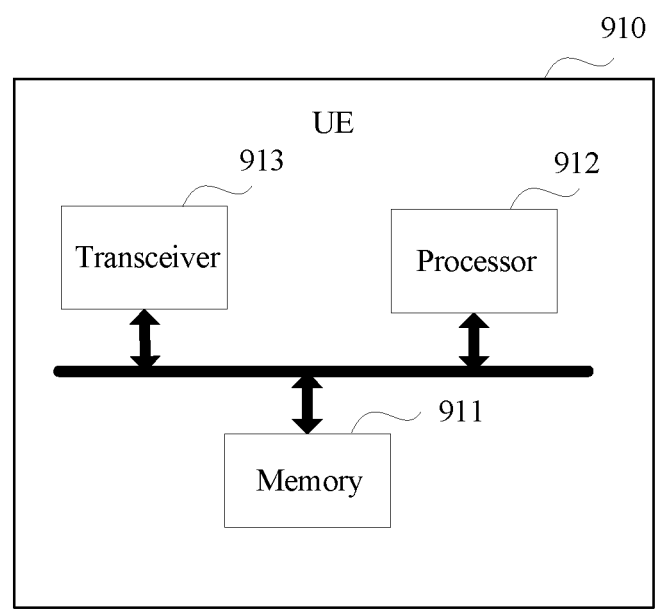
FIG. 13 is a simplified structural diagram of user equipment device according to an embodiment of this application.

When the processing unit 902 is the processor, the communication unit 903 is the transceiver, and the storage unit 901 is the memory, the UE in this embodiment may be UE shown in FIG. 13.

Referring to FIG. 13, the UE 910 includes a processor 912, a transceiver 913, and a memory 911. The transceiver 913, the processor 912, and the memory 911 may communicate with each other by using an internal connection path, and transmit a control signal and/or a data signal. The transceiver 913 may be configured to communicate with a master base station and a secondary base station.

For the purpose of convenient and brief description, for a detailed working process of the foregoing apparatus or unit in the UE 910, refer to a corresponding process in the foregoing method embodiments. Details are not described herein again.

Therefore, the UE provided in this embodiment may determine, based on identification information of a flow to which to-be-sent data belongs, a DRB that matches a QoS requirement of the data, and a bearer can be created and transferred based on flow information.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

All or some of the foregoing embodiments may be implemented through software, hardware, firmware, or any combination thereof. When software is used to implement the embodiments, the embodiments may be all or partially implemented in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The objectives, technical solutions, and benefits of this application are further described in detail in the foregoing specific implementations. It should be understood that the foregoing descriptions are merely specific implementations of this application, but are not intended to limit the protection scope of this application. Any modification, equivalent replacement, or improvement made based on the technical solutions of this application shall fall within the protection scope of this application.

What is claimed is:

1. A method for use in a communication system that includes a master base station and a secondary base station, the method comprising:

sending, by the master base station, a request message to the secondary base station for requesting to transfer one or more flows from the master base station to the secondary base station for transmitting to a terminal device;

receiving, by the master base station from the secondary base station, a response message indicating whether each of the one or more flows is admitted or rejected by the secondary base station; and sending, by the master base station to a core network device, identification information of one or more flows admitted by the master base station, tunnel endpoint information corresponding to the one or more flows admitted by the master base station, identification information of one or more flows flow admitted by the secondary base station, and tunnel endpoint information corresponding to the one or more flows admitted by the secondary base station;

wherein the request message carries one of the following:
1) identification information of each flow requested to be transferred, and information of a data radio bearer (DRB) associated with each flow requested to be transferred; or
2) identification information of each flow requested to be transferred, and a list of one or more DRB identifiers of DRBs available to the secondary base station for transmitting some or all of the admitted flows.

2. The method according to claim 1, wherein identification information of a flow comprises an identifier of a session to which the flow belongs.

3. The method according to claim 1, wherein the request message further comprises quality of service (QoS) characteristic information of each flow requested to be transferred.

4. The method according to claim 1, further comprising:
sending, by the master base station, DRB configuration information to the terminal device, wherein the DRB configuration information comprises a DRB identifier of a DRB and identification information of a flow corresponding to the DRB.

5. The method according to claim 4, wherein the DRB configuration information belongs to a DRB corresponding to the master base station or a DRB corresponding to the secondary base station.

6. The method according to claim 1, further comprising:
adding, by the master base station, a flow identifier to a header of a GPRS (general packet radio service) tunneling protocol (GTP) field of a data packet for performing data forwarding.

7. The method according to claim 1, wherein when the request message carries the identification information of each flow requested to be transferred, and a list of one or more DRB identifiers of DRBs available to the secondary base station for transmitting some or all of the admitted flows, the request message is for the secondary base station to determine a mapping relationship between a DRB and an admitted flow, wherein an identifier of the DRB is in the list of DRB identifiers.

8. A method for transmitting information in a system that includes a master base station and a secondary base station, comprising:
receiving, by the secondary base station, a request message from the master base station for requesting to transfer one or more flows from the master base station to the secondary base station for transmitting to a terminal device;
determining, by the secondary base station, whether to admit or reject each of the one or more flows based on the request message; and
sending, by the secondary base station to the master base station, a response message indicating whether each of the one or more flows is admitted or rejected by the secondary base station;
wherein the request message carries one of the following:
1) identification information of each flow request to be transferred, and information of a data radio bearer (DRB) associated with each flow requested to be transferred; or
2) identification information of each flow requested to be transferred, and a list of one or more DRB identifiers of DRBs available to the secondary base station for transmitting some or all of the admitted flows;
wherein, following the response message from the secondary base station indicating whether each of the one or more flows is admitted or rejected by the secondary base station, the master base station sends, to a core network device, identification information of one or more flows admitted by the master base station, tunnel endpoint information corresponding to the one or more flows admitted by the master base station, identification information of one or more flows admitted by the secondary base station, and tunnel endpoint information corresponding to the one or more flows admitted by the secondary base station.

9. The method according to claim 8, wherein the request message further comprises quality of service (QoS) characteristic information of each flow requested to be transferred.

10. The method according to claim 9, further comprising:
determining, by the secondary base station, a QoS requirement for the DRB associated with each flow requested to be transferred based on the QoS characteristic information.

11. The method according to claim 8, further comprising:
determining, by the secondary base station, a mapping relationship between a DRB and a flow, wherein an identifier of the DRB is in the list of DRB identifiers.

12. The method according to claim 8, wherein if a flow is admitted by the secondary base station, the response message comprises identification information of the flow admitted by the secondary base station and tunnel endpoint information corresponding to the flow.

13. The method according to claim 8, wherein if a flow is rejected by the secondary base station, the response message comprises identification information of the flow that is not admitted by the secondary base station.

14. An apparatus in a master base station of a communication system, wherein the communication system further comprises a secondary base station, and the apparatus comprises:
a processor and a memory for storing program instructions;
wherein the instructions, when executed by the processor, cause the master base station to:
send a request message to the secondary base station for requesting to transfer one or more flows from the master base station to the secondary base station for transmitting to a terminal device;
receive, from the secondary base station, a response message indicating whether each of the one or more flows is admitted or rejected by the secondary base station; and
send, to a core network device, identification information of one or more flows admitted by the master base station, tunnel endpoint information corresponding to the one or more flows admitted by the master base station, identification information of one or more flows admitted by the secondary base station, and tunnel endpoint information corresponding to the one or more flows admitted by the secondary base station;
wherein the request message carries on of the following:
1) identification information of each flow requested to be transferred, and information of a data radio bearer (DRB) associated with each flow requested to be transferred; or
2) identification information of each flow requested to be transferred, and a list of one or more DRB identifiers of DRBs available to the secondary base station for transmitting some or all of the admitted flows.

15. The apparatus according to claim 14, wherein the instructions, when executed by the processor, further cause the master base station to:
send DRB configuration information to the terminal device,
wherein the DRB configuration information comprises a DRB identifier of a DRB and identification information of a flow corresponding to the DRB.

16. The apparatus according to claim 15, wherein the DRB configuration information belongs to a DRB corresponding to the master base station or a DRB corresponding to the secondary base station.

* * * * *